United States Patent
Pan et al.

(10) Patent No.: US 12,463,323 B2
(45) Date of Patent: Nov. 4, 2025

(54) MULTI-BAND ANTENNA SYSTEM FOR A COMMUNICATION DEVICE WITH EXPANDABLE DISPLAY FORM FACTOR

(71) Applicant: MOTOROLA MOBILITY LLC, Wilmington, DE (US)

(72) Inventors: Xuyuan Pan, Chicago, IL (US); Md Faisal Abedin, Lake Bluff, IL (US); Mohammed Abdul-Gaffoor, Palatine, IL (US); Junsheng Zhao, Vernon Hills, IL (US); Mohammadreza Ranjbar Naeini, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 490 days.

(21) Appl. No.: 18/046,886

(22) Filed: Oct. 14, 2022

(65) Prior Publication Data
US 2024/0128636 A1  Apr. 18, 2024

(51) Int. Cl.
*H01Q 1/24* (2006.01)
*H01Q 21/30* (2006.01)
(52) U.S. Cl.
CPC ............. *H01Q 1/243* (2013.01); *H01Q 21/30* (2013.01)
(58) Field of Classification Search
CPC ......... H01Q 1/243; H01Q 21/30; H01Q 21/28
See application file for complete search history.

(56) References Cited

U.S. PATENT DOCUMENTS

| | | | | |
|---|---|---|---|---|
| 11,228,093 B2* | 1/2022 | Won | ........................ | H01Q 1/44 |
| 11,387,575 B2* | 7/2022 | Choi | ........................ | H01Q 9/42 |
| 12,015,208 B2* | 6/2024 | Kim | ........................ | H04B 1/401 |
| 12,143,524 B2* | 11/2024 | Kim | ..................... | H04M 1/0262 |
| 12,199,654 B2* | 1/2025 | Yoon | ........................ | H04B 1/005 |
| 12,200,152 B2* | 1/2025 | Kim | ..................... | H04M 1/0235 |
| 2009/0085696 A1* | 4/2009 | Abdul-Gaffoor | ........ | H04B 5/22 333/24 C |
| 2021/0336356 A1* | 10/2021 | Choi | ..................... | G06F 1/1652 |
| 2021/0359392 A1* | 11/2021 | Won | ..................... | H04M 1/0237 |
| 2021/0408658 A1* | 12/2021 | Pais | ........................ | H01Q 21/08 |
| 2023/0352814 A1* | 11/2023 | An | ........................ | G06F 1/1652 |
| 2024/0097315 A1* | 3/2024 | Kim | ........................ | H01Q 21/28 |
| 2024/0097322 A1* | 3/2024 | Kim | ........................ | H01Q 3/12 |
| 2024/0106103 A1* | 3/2024 | Kim | ........................ | H01Q 21/28 |
| 2024/0128636 A1* | 4/2024 | Pan | ........................ | H01Q 21/30 |
| 2024/0128637 A1* | 4/2024 | Pan | ........................ | H04M 1/026 |

(Continued)

*Primary Examiner* — Imani N Hayman
*Assistant Examiner* — Theron S Milliser
(74) *Attorney, Agent, or Firm* — Isidore PLLC (57) ABSTRACT

A communication device and a method of making a communication device having an antenna assembly display and that supports multi-band communication. A multi-band antenna assembly of the communication device is incorporated into a telescoping support structure positionable between a compact arrangement and an extended arrangement to change an amount of a scrollable or rollable flexible display is presented. The antenna assembly includes at least one upper antenna positioned at an upper lateral side of a top end portion of the telescoping support portion and at least one lower antenna positioned at a lower lateral side of a bottom end portion of the telescoping support structure. The antenna assembly supports multi-band radio frequency (RF) communication in support of cellular and wireless protocols.

18 Claims, 8 Drawing Sheets

(56) References Cited

U.S. PATENT DOCUMENTS

2024/0214478 A1\* 6/2024 Kim .................... H04M 1/0262
2024/0267444 A1\* 8/2024 Kim ........................ H04B 1/44
2025/0008011 A1\* 1/2025 Jung ................... H04M 1/0268
2025/0023228 A1\* 1/2025 An ........................... H01Q 1/24

\* cited by examiner

MULTI-BAND ANTENNA SYSTEM FOR A COMMUNICATION DEVICE WITH EXPANDABLE DISPLAY FORM FACTOR

BACKGROUND

1. Technical Field

The present disclosure relates generally to a communication device having an antenna assembly that supports multi-band and multi-spatial communications, and more particularly to a communication device having an expandable form factor that supports multi-band/multi-spatial communications.

2. Description of the Related Art

Mobile communication devices such as smartphones provide a large amount of functionality in a small form factor. The small size enables mobility but limits available space for antennas. To support increased data throughput for functions such as media streaming, mobile communication devices are incorporating millimeter wave (mmWave) communication subsystems to support upper bands allocated to fifth generation (5G) new radio (NR) technologies. The higher frequencies can inherently support greater data speeds. However, the mmWave signals are also inherently more directional as compared to lower radio frequency (RF) bandwidths used for fourth generation (4G) technologies such as the 3rd Generation Partnership Project (3GPP) long term evolution (LTE). Presenting antennas in all required directions is difficult within the form factor of small mobile communication devices that are hand carried or stowed in a pocket. In addition, the mobile communication device requires continued support for legacy communication protocols. Antennas are needed to support communications in multiple radio frequency (RF) communication bands such as: (i) low band (LB) (e.g., ≤1 GHz); (ii) medium band (MB) (e.g., 1.7 to 2.2 GHz); (iii) high band (HB) (e.g., 2.3 to 2.7 GHz); (iv) ultra-high band (UHB) (e.g., 3.3 to 5 GHz); and (v) millimeter wave (mmWave) band (e.g., ≥24 GHz). A plurality of antennas that are placed at spaced apart positions are required to provide support for spatial diversity, multiple input multiple output (MIMO) operation, and concurrent communications, including for carrier aggregation and transmit diversity.

Typical handheld communication devices have a "candy bar" form factor with limited areas for antenna due to a front surface typically devoted to a display and not to antennas. Communication devices that have a form factor with a movable section, such as flip, slider and swivel form factors, are also available provide easier stowing. With the introduction of a flexible display, communication devices are being introduced with a rollable form factor. A structure of the communication device extends on one or two ends to support a larger portion of the flexible display on one surface, such as a front side. When a more compact arrangement is desired with the one or two ends retracted, an excess portion of the flexible display is rolled onto a face side of the structure. The changing form factor of rollable and scrollable communication devices limits placement of antennas to support the needed communication bands and spaced arrangement required for higher band radio access technologies (RATs).

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to a first aspect of the present disclosure, a communication device and a method of making the communication device provide an antenna subsystem for multi-band communication that is incorporated within a telescoping support structure. The communication device has a telescoping support structure that includes a top end portion and a bottom end portion positionable between a compact arrangement and an extended arrangement. At least one of the top end portion and the bottom end portion has one of: (i) a rolling member; and (ii) a scrolling member. A flexible display of the communication device is positioned across a first surface of the telescoping support structure. The flexible display is engaged to each of the top end portion and the bottom end portion. The one of the rolling member and the scrolling member diverts a portion of the flexible display in excess of a length of the first surface. The communication device includes at least one upper antenna positioned at an upper lateral side of the top end portion. The communication device includes at least one lower antenna positioned at a lower lateral side of the bottom end portion. In one or more embodiments, the at least one upper antenna is configured to support radio frequency (RF) communication transmissions in: (i) medium band (MB) of 1.7 to 2.2 GHz; (ii) high band (HB) of 2.3 to 2.7 GHz; and (iii) ultra-high band (UHB) of 3.3 to 5 GHz. The at least one lower antenna is configured to support RF communication transmissions in: (i) low band (LB) less than or equal to 1 GHz; (ii) MB; (iii) HB; and (iv) UHB. In one or more embodiments, the communication device further includes at least one millimeter wave (mmWave) band antenna that operates in a radio frequency of at least 24 GHz.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
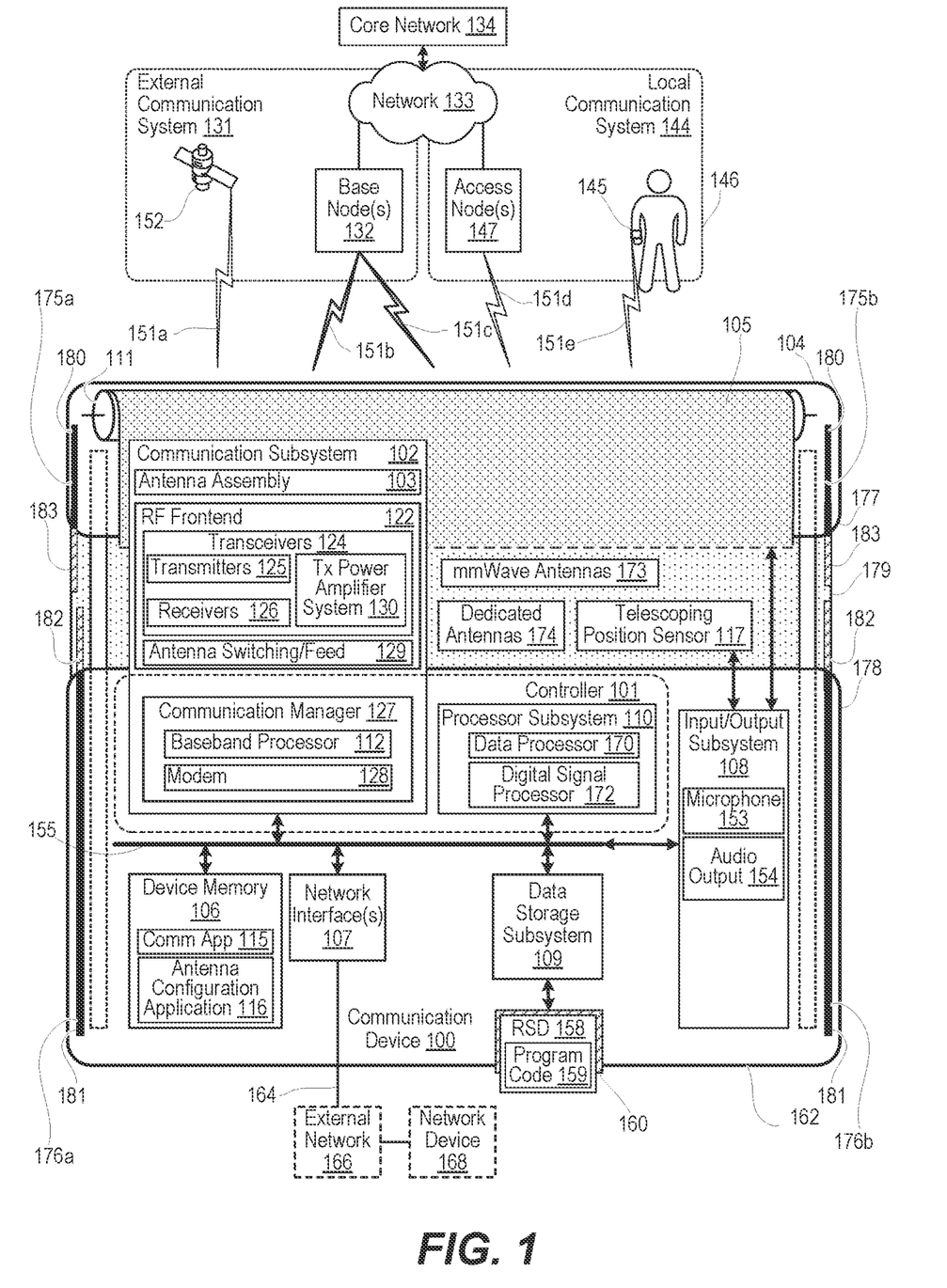
FIG. 1 depicts a functional block diagram of a communication environment including a communication device having an antenna assembly incorporated into a telescoping support structure for rollable or scrollable flexible display, according to one or more embodiments.

FIG. 1 is a functional block diagram of communication device 100 in an operating environment within which the features of the present disclosure are advantageously implemented. In particular, communication device 100, managed by controller 101, has communication subsystem 102 with antenna assembly 103. Antenna assembly 103 supports communication in multiple radio frequency (RF) bands and supports simultaneous or switched communication between multiple antenna in the same RF for spatial diversity or multiple input multiple out (MIMO) operation. Telescoping support structure 104 of communication device is positionable between a compact arrangement, such as for stowage, and an extended arrangement that mechanically reconfigures antenna assembly 103 to support one or more lower RF communication bands. In one or more embodiments, flexible display 105 rolls or scrolls on and/or off rolling/scrolling member 111 to correspond to a length of telescoping support structure 104.

Communication device 100 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to controller 101 and communication subsystem 102, communication device 100 includes device memory 106, network interface(s) 107, input/output (I/O) subsystem 108, and data storage subsystem 109 that are each managed by controller 101. Controller 101 may include or consist essentially of processor subsystem 110. In one or more embodiments, controller 101 also includes one or more baseband processors 112 of communication subsystem 102. Device memory 106 stores program code for applications, such as communication application 115, antenna configuration application 116, and other application(s). Device memory 106 further includes an operating system (OS), a firmware interface, such as basic input/output system (BIOS) or Uniform Extensible Firmware Interface (UEFI), and firmware.

Controller 101 includes processor subsystem 110, which executes program code to provide operating functionality of communication device 100. The functionality includes configuring communication subsystem 102 for communication using a mechanically reconfigurable antenna assembly 103. The software and/or firmware modules have varying functionality when their corresponding program code is executed by processor subsystem 110 or secondary processing devices within communication device 100. Processor subsystem 110 of controller 101 can execute program code of communication application 115, antenna configuration application 116 and other application(s) to configure communication device 100 to perform specific functions. Device memory 106 can include data used by the applications. Antenna configuration application 116 monitors communication application 115 to determine what communication bands are required and monitors antenna assembly 103 and/or telescoping position sensor 117 to determine what communication bands are supported. Controller 101, executing antenna configuration application 116, can configure communication subsystem 102 to select available antennas of antenna assembly 103 to support communication application 115.

RF frontend 122 of communication subsystem 102 has one or more transceivers 124 that includes one or more transmitters 125 and one or more receivers 126. Communication manager 127 include baseband processor 112 and one or more modems 128. RF frontend 122 includes antenna switching and feed networks 129 to connect particular antennas of antenna assembly 103 at a selected phase delay and in particular combinations. Power amplifier systems 130 of RF frontend 122 set the transmit power levels provided to antennas connected by antenna switching and feed networks 129.

Baseband processors 112 communicates with controller 101 and RF frontend 122. In one or more embodiments, baseband processors 112 perform a primary or support function as part of controller 101. Communication subsystem 102 communicates with external communication system 131. Baseband processor 112 operates in baseband frequency range to encode data for transmission and decode received data, according to a communication protocol. Baseband modems 128 modulate baseband encoded data from corresponding communication manager 127 onto a carrier signal to provide a transmit signal that is amplified by power amplifiers in transmitters 125 and delivered to antennas. Baseband modems 128 encode uplink signals and decode downlink signals that are communicated. Baseband modems 128 demodulate received signals from external communication system 131 detected by antenna assembly 103. The received signal is amplified and filtered by receivers 126, which demodulate received encoded data from a received carrier signal. In an example, communication subsystem communicates with cellular network or base nodes 132 that are part of one or more radio access network (RANs) to connect to communication network(s) 133. Communication network(s) 133 may be communicatively connected to core network 134.

Antenna assembly 103 supports communication with local communication system 144. Local communication system 144 can include localized or personal devices 145, such as a wireless headset, head mounted display, and a smart watch worn by user 146. Local communication systems 144 can further include access nodes 147 for wireless communication. Communication devices 100 can be provided communication services by wide area network(s) that are part of external communication system 131 and linked to access nodes 147. Wide area network(s) may also provide data services to communication network(s) 133 that provide communication service to communication device 100 via base nodes 132.

Communication subsystem 102 can concurrently transmit multiple uplink channels and receive multiple downlink channels. In an example, communication subsystem 102 receives satellite broadcast signals 151a from GPS satellites 152. Communication subsystem 102 communicates with base nodes 132 via uplink/downlink channels 151b-151c. Communication subsystem 102 can communicate with access node 147 via transmit/receive signals 151d. Communication subsystem 102 communicates with localized or personal device 145 via transmit/receive signals 151e.

In one or more embodiments, controller 101, via communication subsystem 102, performs multiple types of cellular over-the-air (OTA) or wireless communication with external communication system 131. Communication subsystem 110 can communicate via Bluetooth connection with one or more personal access network (PAN) devices such as localized or personal devices 145. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols (e.g., "Wi-Fi"). Access node 147 is connected to wide area network(s), such as the Internet. In one or more embodiments, communication subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code, and stored data on nonvolatile storage that is accessible by controller 101. For example, data storage subsystem 109 can provide a selection of applications and computer data such as antenna configuration application 116. Antenna configuration application 116 can be loaded into device memory 106 for execution by controller 101. In one or more embodiments, data storage device(s) can include hard disk drives (HDDs), optical disk drives, and/or solid-state drives (SSDs), etc. Data storage subsystem 109 of communication device 100 can include one or more non-transitory computer readable storage devices or computer readable storage devices, such as removable storage device (RSD) 158 that contains program code 159 and that is received in RSD interface 160. Controller 101 is communicatively connected to RSD 158, via system interlink 155 and RSD interface 160. Controller 101 can access RSD 158 to provision communication device 100 with program code 159, such as code for antenna configuration application 116 and related computer data, that when executed by controller 101 configures computer device 100 to perform functionality described herein.

I/O subsystem 108 includes user interface components such as flexible display 105 that presents a user interface. I/O subsystem 108 may include acceleration/movement sensor(s), vibration output device, light output device, image capturing device(s), microphone 153, touch/haptic controls, and audio output device(s) 154. I/O subsystem 108 also may include an I/O controller. The I/O controller provides communication and power signals to functional components described herein as part of communication subsystem 102, device memory 106, I/O subsystem 108, or data storage subsystem 109. The I/O controller connects to internal devices, which are internal to housing 162 that includes at least telescoping support structure 104. The I/O controller connects via an electrical cable to tethered peripheral devices, which are external to telescoping support structure 104 of communication device 100. Internal devices can include computing, storage, communication, or sensing components depicted within housing 162. The I/O controller supports the necessary configuration of connectors, electrical power, communication protocols, and data buffering to act as an interface between internal devices and peripheral devices tethered by the electrical cable and other components of communication device 100 that use a different configuration for inputs and outputs.

Network interface(s) 107 can include a network interface controller (NIC) with a network connection/cable 164 connection to external network 166. Network connection/cable 164 may include wireless and/or wired links. Network interface(s) 107 support one or more network communication protocols. External network 166 can be a local area network (LAN), a campus area network (CAN), a metropolitan area network (MAN), or a wide area network (WAN). For example, network connection/cable 164 can be an Ethernet connection/cable. Network device 168 is communicatively coupled to external network 166.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 170. Processor subsystem 110 can include one or more digital signal processors 172 that are integrated with data processor 170. Processor subsystem 110 can include other processors that are communicatively coupled to data processor 170, such as baseband processors 112 of corresponding communication managers 127. In one or embodiments that are not depicted, controller 101 can further include distributed processing and control components that are external to telescoping support structure 104 or grouped with other components, such as I/O subsystem 108. Data processor 170 is communicatively coupled, via system interlink 155, to device memory 106. In one or more embodiments, data processor 170 is communicatively coupled via system interlink 155 to communication subsystem 102, I/O subsystem 108, and data storage subsystem 109.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

According to aspects of the present disclosure, antenna assembly 103 supports various RF bands for wireless and cellular services in or more of low band (LB), medium band (MB), high band (HB), and ultra-high band (UHB) using multi-band antennas described below. In addition, antenna assembly 103 includes millimeter wave band (mmWave) antennas 173 to support newer radio access technologies (RATs). To support multi band operation, antenna assembly 103 may be configured for dual low band (2L) or quad low band (4L) multiple input multiple output (MIMO) operation that dictates that multiple antennas communicate on multiple bands simultaneously. Antenna assembly 103 enables spatial diversity by positioning multi-band or dedicated antennas at spaced apart locations to mitigate antenna blocking by a hand or head of user. Antenna assembly 103 includes dedicated antennas 174 to support certain types of communication such as: (i) global positioning system (GPS) signals; (ii) IEEE 802.11 WLAN protocols (e.g., "Wi-Fi"); (iii) ultra-wideband (UWB); (iv) near field communication (NFC).

In one or more embodiments, four (4) multi-band antennas of antenna assembly 103 are positioned at four corners of telescoping support structure 104: (i) upper left multi-band antenna 175a; (ii) upper right multi-band antenna 175b; (ii) lower left multi-band antenna 176a; and (iv) lower right multi-band antenna 176b. Telescoping support structure 104 includes first end portion 177 at one end, such as the top of communication device 100, a second end portion 178 at an opposite end to first end portion 177, and intermediate portion 179 that slidingly engages one or both of first and second end portions 177-178. Intermediate portion 179 bridges a gap between first and second end portions 177-178 when first and second end portions 177-178 are moved apart from at least a compact arrangement to an extended arrangement. Changing the positioning of telescoping support structure 104 mechanically reconfigures antenna assembly 103. In an example, upper left and right multi-band antennas 175a-175b each include first antenna element 180 on respective lateral sides of top end portion 177 that moves away from lower left and right multi-band antennas 176a-176b, which generally increases antenna isolation and thus improves antenna performance. In another example, some antennas positioned at intermediate portion 179, such as mmWave antennas 173 or dedicated antennas 174, may be obstructed by one or both of top and bottom end portions 177-178 while telescoping support structure 104 is in the compact arrangement.

In an additional example, antenna assembly 103 may be mechanically reconfigured by changing the length or antenna configuration of one or more antennas by having antenna elements moving independently with intermediate portion 179 and one of top and bottom end portions 177-178. Lower left and right multi-band antennas 176a-176b each include second antenna element 181 on second end portion 178 and third antenna element 182 on intermediate portion 179. Third antenna element 182 is electromagnetically coupled to second antenna element 181 to transceive one or more RF communication bands and adds one or more lower RF communication bands when telescoping support structure 104 is in the first extended arrangement. The one or more lower RF communication bands are not supported when telescoping support structure 104 is in the compact arrangement. One or more transceivers 124 are configurable to transceive in two or more RF communication bands. An antenna switching mechanism such as antenna switching/feeding network 129 configures antenna assembly 103 to support transceiving by one or more transceivers 124 according to supported RF communication bands, while telescoping support structure 104 is in a corresponding one of the compact arrangement and the first extended arrangement. Alternatively, or in addition, upper left and right multi-band antennas 175a-175b may each include a fourth antenna element 183 positioned at intermediate portion 179 that moves relative to first antenna element 180.

In one or more embodiments, microphone 153 is positioned at bottom end portion 178 and audio output device 154, which includes an earpiece speaker, is positioned at top end portion 177. Antenna switching and feed network 129 configures antenna assembly 103 for use of communication device 100 while next to a head of user 146. In one or more embodiments, telescoping support structure 104 extends top end portion 177 relative to intermediate portion 179 and antenna switching and feed network 129 configures antenna assembly 103 for use of communication device 100 in a hand of user 146, away from the user's head.

Figure 2A:
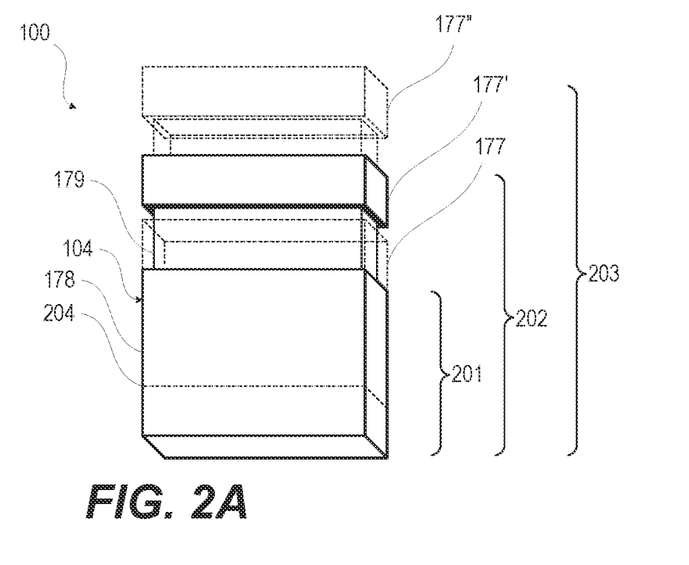
FIG. 2A is a three-dimensional view of a telescoping support structure of a handheld communication device having a top end portion positionable between a compact arrangement and an extended arrangement, according to one or more embodiments.

FIG. 2A is a three-dimensional view of telescoping support structure 104 of communication device 100 having top end portion 177 that moves from compact arrangement 201 to regular "A" arrangement 202 and further to first extended arrangement 203. In compact arrangement 201, top end portion 177 is adjacent to bottom end portion 178. In one or more embodiments, a portion of intermediate portion 179 may be exposed between top end portion 177 and bottom end portion 178 in compact arrangement 201. In one or more embodiments, top end portion 177 may be adjacent to bottom end portion 178 in compact arrangement 201, completely covering intermediate portion 179. Top end portion 177' in regular "A" arrangement 202 is positioned away from bottom end portion 178 exposing intermediate portion 179. When further expanded to first extended arrangement 203, top end portion 177" is at a furthest position away from bottom end portion 178. In an example, compact arrangement 201 is useful for stowage. Regular "A" arrangement 202 is an intermediate size for handheld communications with improved antenna performance over compact arrangement 201. Extended arrangement 203 is a largest size for appropriate for stationary viewing of video content. In one or more embodiments, extended arrangement 203 enables additional space to expose high data throughput/low data latency antennas such as mmWave antennas. In one or more embodiments, telescoping support structure 104 also includes lower end portion 178 that can move relative to intermediate portion 179. In an example, separation 204 is between intermediate portion 179 and bottom end portion 178.

Figure 2B:
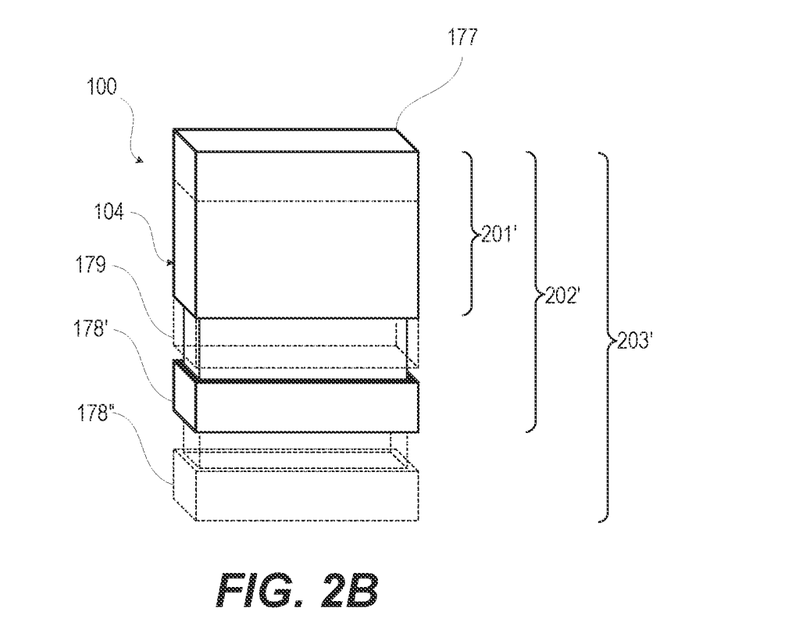
FIG. 2B is a three-dimensional view of the telescoping support structure having a bottom end portion positionable between a compact arrangement and an extended arrangement, according to one or more embodiments.

FIG. 2B is a three-dimensional view of telescoping support structure 104 of communication device 100 having top end portion 178 that moves from compact arrangement 201' to regular "B" arrangement 202' and further to second extended arrangement 203'. In compact arrangement 201', top end portion 177 is adjacent, or at a closest support position, to bottom end portion 178. In regular "B" arrangement 202', top end portion 177' moves to regular "B" arrangement 202' positioned away from bottom end portion 178 exposing intermediate portion 179. When further expanded to second extended arrangement 203', top end portion 177" is at a furthest position away from bottom end portion 178. In one or more embodiments, telescoping support structure 104 telescopes in both top and bottom directions.

Figures 3A, 3B:
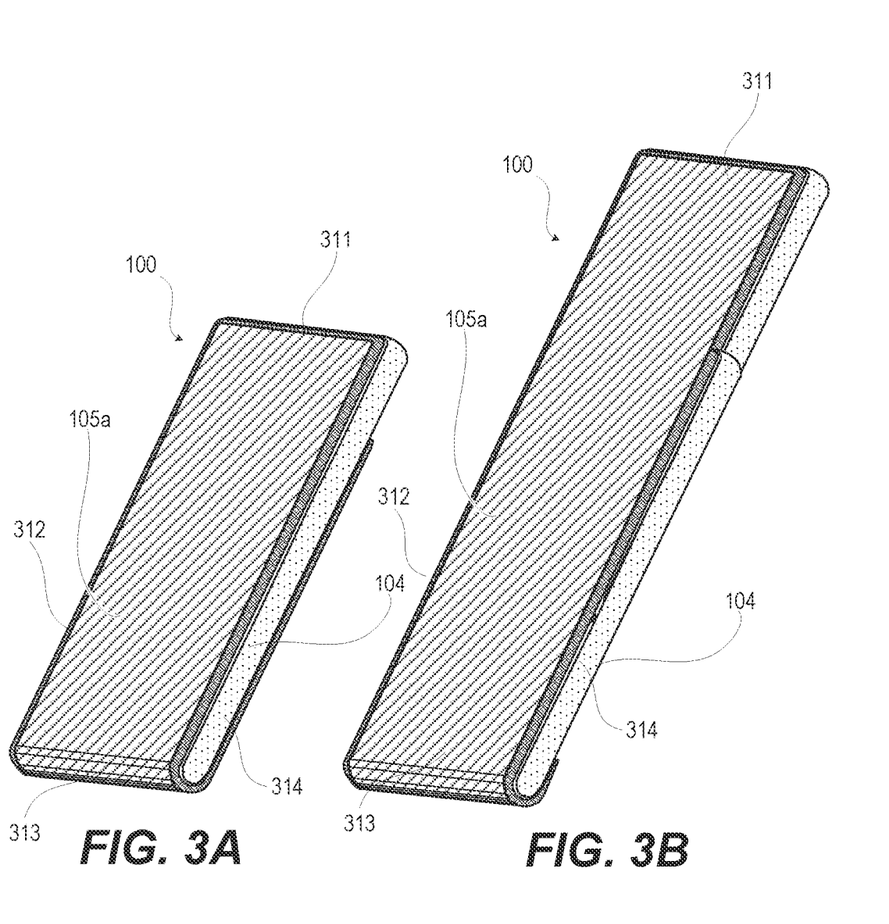
FIG. 3A is a three-dimensional view of a communication device having a telescoping support structure in a compact arrangement that supports a scrolling flexible display, according to one or more embodiments.
FIG. 3B is a three-dimensional view of the communication device of FIG. 3A having a telescoping support structure in an expanded arrangement, according to one or more embodiments.

FIG. 3A is a three-dimensional view of communication device 100 having telescoping support structure 104a in a compact arrangement that supports rolling flexible display 105a. An excess length of scrolling flexible display 105a "rolls" onto a backside of communication device 100, which limits placement of mmWave or dedicated antennas 173-174 (FIG. 1). FIG. 3B is a three-dimensional view of communication device 100 of FIG. 3A having telescoping support structure 104a in an expanded arrangement presenting an extended length of rolling flexible display 105a. With reference to FIGS. 3A-3B, communication device 100 has top edge 311, left edge 312, bottom edge 313, and right edge 314. Rolling flexible display 105a engages rolling/scrolling member 111 (FIG. 1) along bottom edge 313, which limits or prevents positioning of a multiband antenna along bottom edge 313. In one or more embodiments, a communication device may include a rolling/scrolling member 111 (FIG. 1) along top edge 311, which limits or prevents positioning of a multiband antenna along top edge 311.

Figures 3C, 3D:
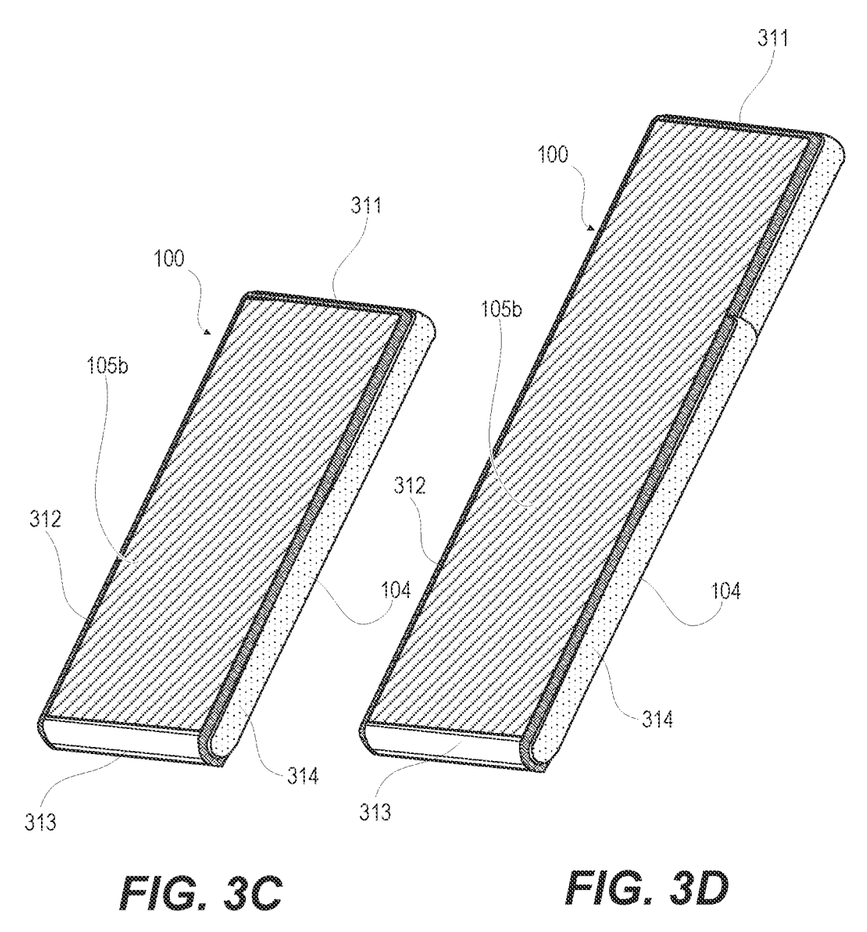
FIG. 3C is a three-dimensional view of a communication device having a telescoping support structure in a compact arrangement that supports a rolling flexible display, according to one or more embodiments.
FIG. 3D is a three-dimensional view of the communication device of FIG. 3C having a telescoping support structure in an expanded arrangement, according to one or more embodiments.

FIG. 3C is a three-dimensional view of communication device 100 having telescoping support structure 104 in a compact arrangement that supports scrolling flexible display 105b. FIG. 3D is a three-dimensional view of communication device 100 of FIG. 3C having telescoping support structure 104 in an expanded arrangement presenting an extended length of scrolling flexible display 105b. With reference to FIGS. 3C-3D, communication device 100 has top edge 311, left edge 312, bottom edge 313, and right edge 314. Scrolling flexible display 105b engages rolling/scrolling member 111 (FIG. 1) along bottom edge 313, which limits or prevents positioning of a multiband antenna along bottom edge 313. In one or more embodiments, a communication device may include a rolling/scrolling member 111 (FIG. 1) along top edge 311, which limits or prevents positioning of a multiband antenna along top edge 311.

Figure 4A:
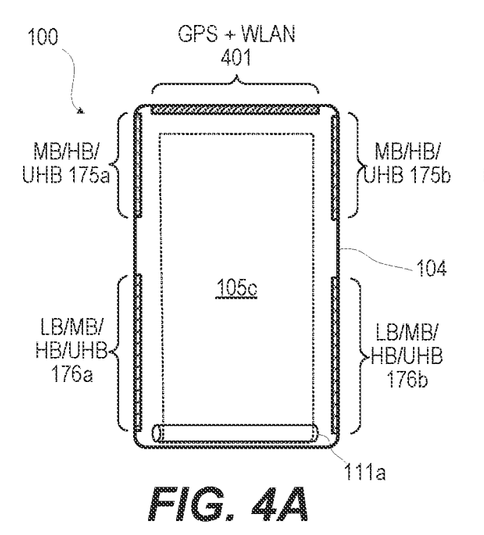
FIG. 4A is a front view of a communication device having a telescoping support structure that supports a bottom rolling flexible display in a compact arrangement, according to one or more embodiments.
Figure 4B:
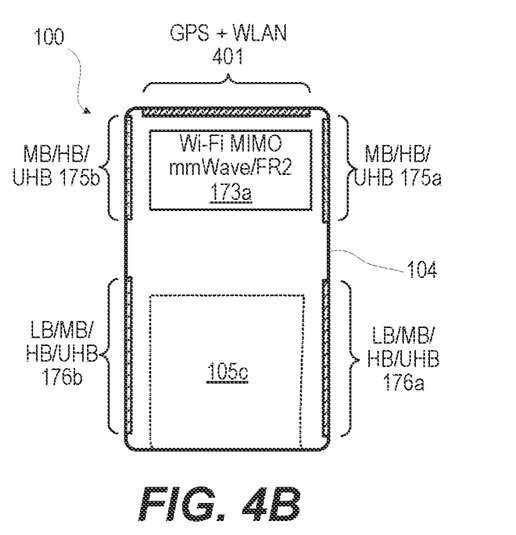
FIG. 4B is a back view of the communication device of FIG. 4A having the telescoping support structure that supports the bottom rolling flexible display in the compact arrangement, according to one or more embodiments.
Figure 4C:
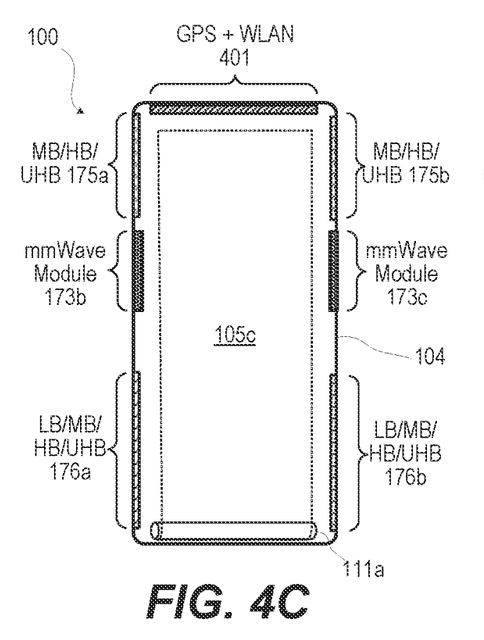
FIG. 4C is a front view of the communication device of FIG. 4A having the telescoping support structure that presents additional lateral side millimeter wave (mmWave) antennas in an extended arrangement, according to one or more embodiments.
Figure 4D:
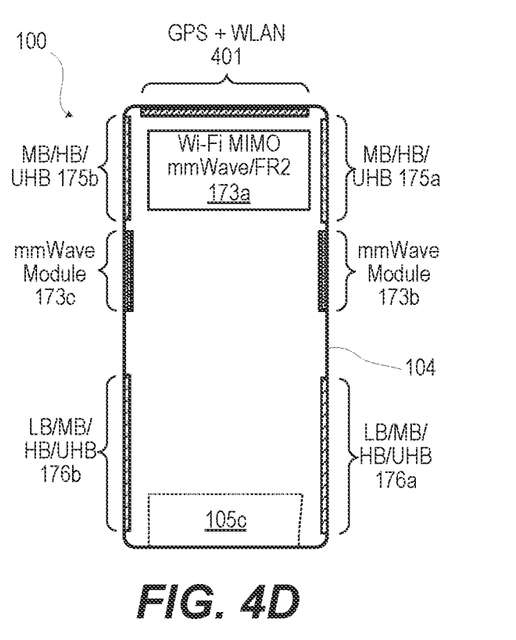
FIG. 4D is a back view of the communication device of FIG. 4A having the telescoping support structure in the extended arrangement, according to one or more embodiments.

FIG. 4A is a front view of communication device 100 having telescoping support structure 104 that supports bottom rolling flexible display 105c with a bottom rolling member 111a in a compact arrangement. Upper left and right multiband antennas 175a-175b are positioned respectively at upper left and right lateral sides of telescoping support structure and configured to support MB, HB, and UHB RF communications. Lower left and right multiband antennas 176a-176b are positioned respectively at lower left and right lateral sides of telescoping support structure 104 and configured to support LB, MB, HB, and UHB RF communications. GPS/WLAN antenna 401 is positioned across a top edge of telescoping support structure 104. FIG. 4B is a back view of communication device 100 of FIG. 4A having telescoping support structure 104 that supports bottom rolling flexible display 105c in the compact arrangement. Back mmWave antenna 173a is positioned outside of an area covered by bottom rolling flexible display 105c. In one or more embodiments, back mmWave antenna 173a supports Wi-Fi MIMO mmWave in second frequency range (FR2). FIG. 4C is a front view of communication device 100 of FIG. 4A having telescoping support structure 104 that, in addition to back mmWave antenna 173a (FIG. 4D), presents additional lateral side mmWave antennas 173b-173c when telescoping support structure 104 is in an extended arrangement. FIG. 4D is a back view of communication device 100 of FIG. 4A having telescoping support structure 104 in the extended arrangement. Video content may be presented with an enlarged viewing area, which corresponds to availability of additional high data throughput/low data latency capabilities mmWave antennas 173b-173c. In addition, since mmWave is more directional than lower frequency bands, the spatial positioning of the three mmWave antennas 173a-173c provides better reception coverage.

Figure 5A:
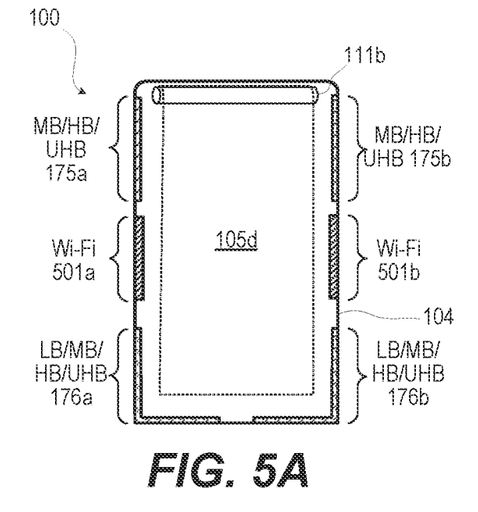
FIG. 5A is a front view of a communication device having a telescoping support structure that supports a top rolling flexible display in a compact arrangement, according to one or more embodiments.
Figure 5B:
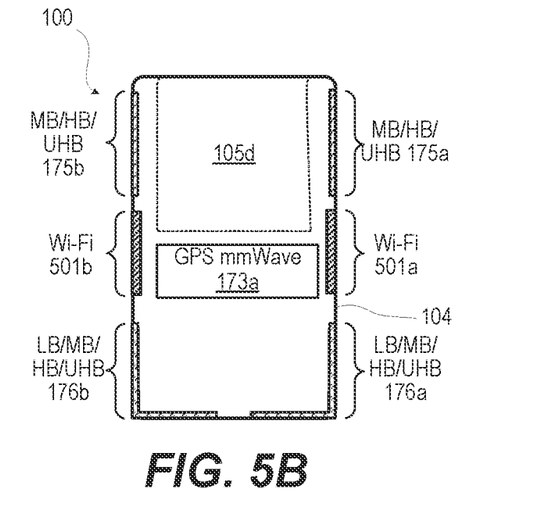
FIG. 5B is a back view of the communication device of FIG. 5A having the telescoping support structure that supports the top rolling flexible display in the compact arrangement, according to one or more embodiments.
Figure 5C:
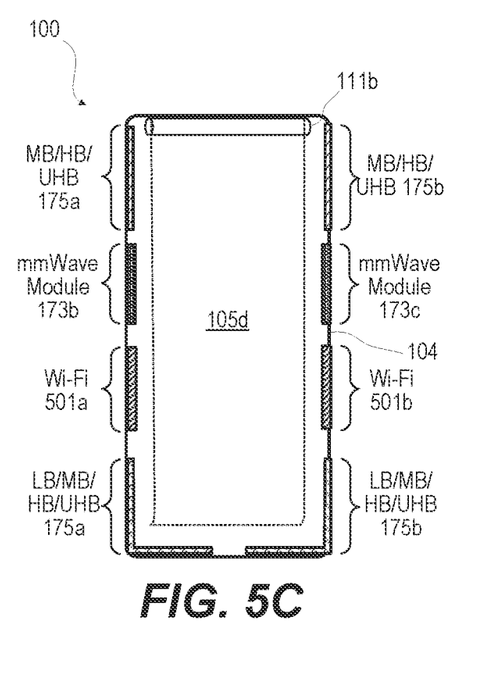
FIG. 5C is a front view of the communication device of FIG. 5A having the telescoping support structure that presents additional lateral side mmWave antennas in an extended arrangement, according to one or more embodiments.
Figure 5D:
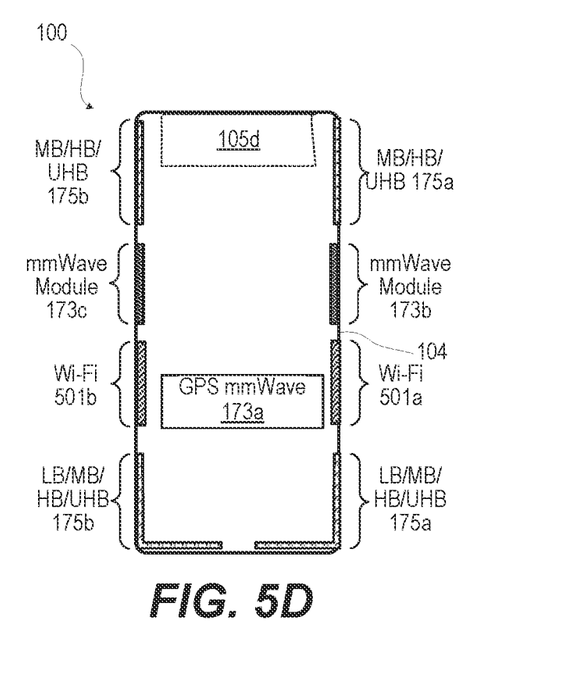
FIG. 5D is a back view of the communication device of FIG. 5A having the telescoping support structure in the extended arrangement, according to one or more embodiments.

FIG. 5A is a front view of communication device 100 having telescoping support structure 104 that supports top rolling flexible display 105d with top rolling member 111b in a compact arrangement. Upper left and right multiband antennas 175a-175b are positioned respectively at upper left and right lateral sides of telescoping support structure and configured to support MB, HB, and UHB RF communications. Lower left and right multiband antennas 176a-176b are positioned respectively at lower left and right lateral sides of telescoping support structure 104 and configured to support LB, MB, HB, and UHB RF communications. Left Wi-Fi antenna 501a is positioned between upper and lower left multiband antennas 175a and 176a. Right Wi-Fi antenna 501b is positioned between upper and lower right multiband antennas 175b and 176b. FIG. 5B is a back view of communication device 100 of FIG. 5A having telescoping support structure 104 that supports top rolling flexible display 105d in the compact arrangement. Back mmWave antenna 173a is positioned outside of an area covered by bottom rolling flexible display 105d. In one or more embodiments, back mmWave antenna 173a supports GPS and mmWave bands. FIG. 5C is a front view of communication device 100 of FIG. 5A having telescoping support structure 104 that, in addition to back mmWave antenna 173a (FIG. 5D), presents additional lateral side mmWave antennas 173b-173c when telescoping support structure 104 is in an extended arrangement. FIG. 5D is a back view of communication device 100 of FIG. 5A having telescoping support structure 104 in the extended arrangement.

Figure 6A:
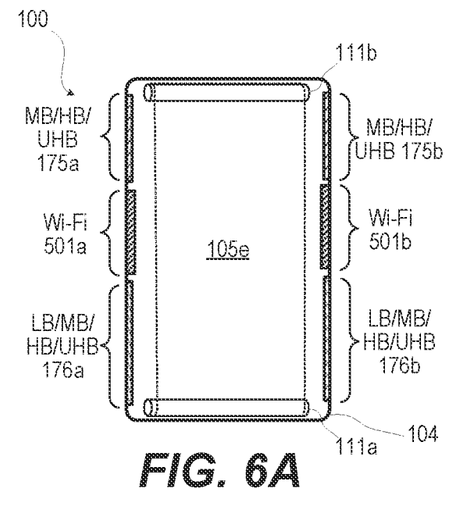
FIG. 6A is a front view of a communication device having a telescoping support structure that supports top and bottom rolling flexible display in a compact arrangement, according to one or more embodiments.
Figure 6B:
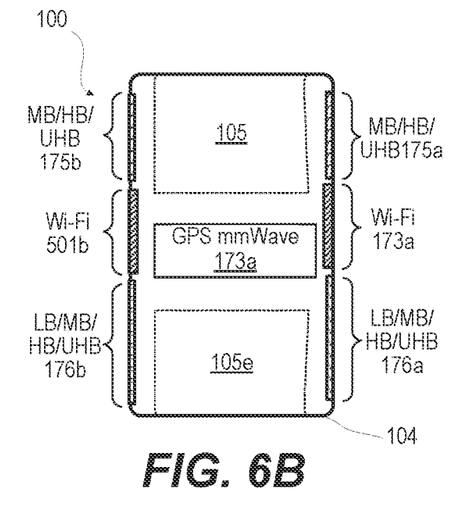
FIG. 6B is a back view of the communication device of FIG. 6A having the telescoping support structure that supports the top and bottom rolling flexible display in the compact arrangement, according to one or more embodiments.
Figure 6C:
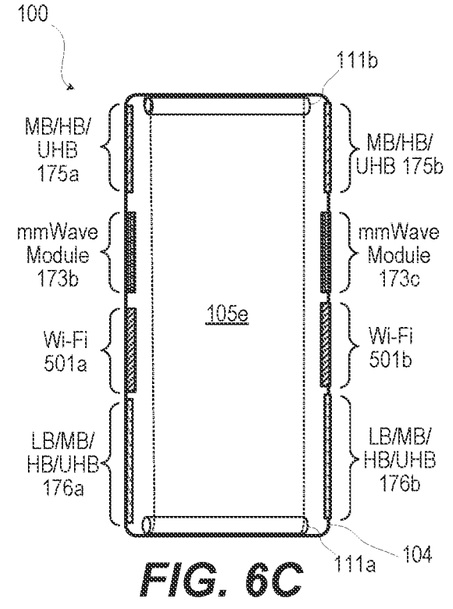
FIG. 6C is a front view of the communication device of FIG. 6A having the telescoping support structure that presents additional lateral side millimeter wave (mmWave) antennas in an extended arrangement, according to one or more embodiments.
Figure 6D:
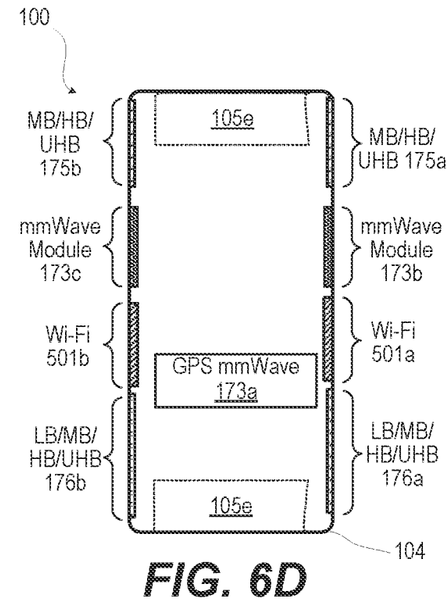
FIG. 6D is a back view of the communication device of FIG. 6A having the telescoping support structure in the extended arrangement, according to one or more embodiments.

FIG. 6A is a front view of communication device 100 having telescoping support structure 104 that supports top and bottom rolling flexible display 105e with bottom rolling member 111a and top rolling member 111b in a compact arrangement. Upper left and right multiband antennas 175a-175b are positioned respectively at upper left and right lateral sides of telescoping support structure and configured to support MB, HB, and UHB RF communications. Lower left and right multiband antennas 176a-176b are positioned respectively at lower left and right lateral sides of telescoping support structure 104 and configured to support LB, MB, HB, and UHB RF communications. Left Wi-Fi antenna 501a is positioned between upper and lower left multiband antennas 175a and 176a. Right Wi-Fi antenna 501b is positioned between upper and lower right multiband antennas 175b and 176b. FIG. 6B is a back view of communication device 100 of FIG. 6A. Back mmWave antenna 173a is positioned outside of an area covered by bottom rolling flexible display 105e. In one or more embodiments, back mmWave antenna 173a supports GPS and mmWave bands. FIG. 6C is a front view of communication device 100 of FIG. 6A while telescoping support structure 104 is in an extended arrangement. Telescoping support structure 104, in addition to back mmWave antenna 173a (FIG. 6D), presents additional lateral side mmWave antennas 173b-173c. FIG. 6D is a back view of communication device 100 of FIG. 6A having telescoping support structure 104 in the extended arrangement.

Figure 7:
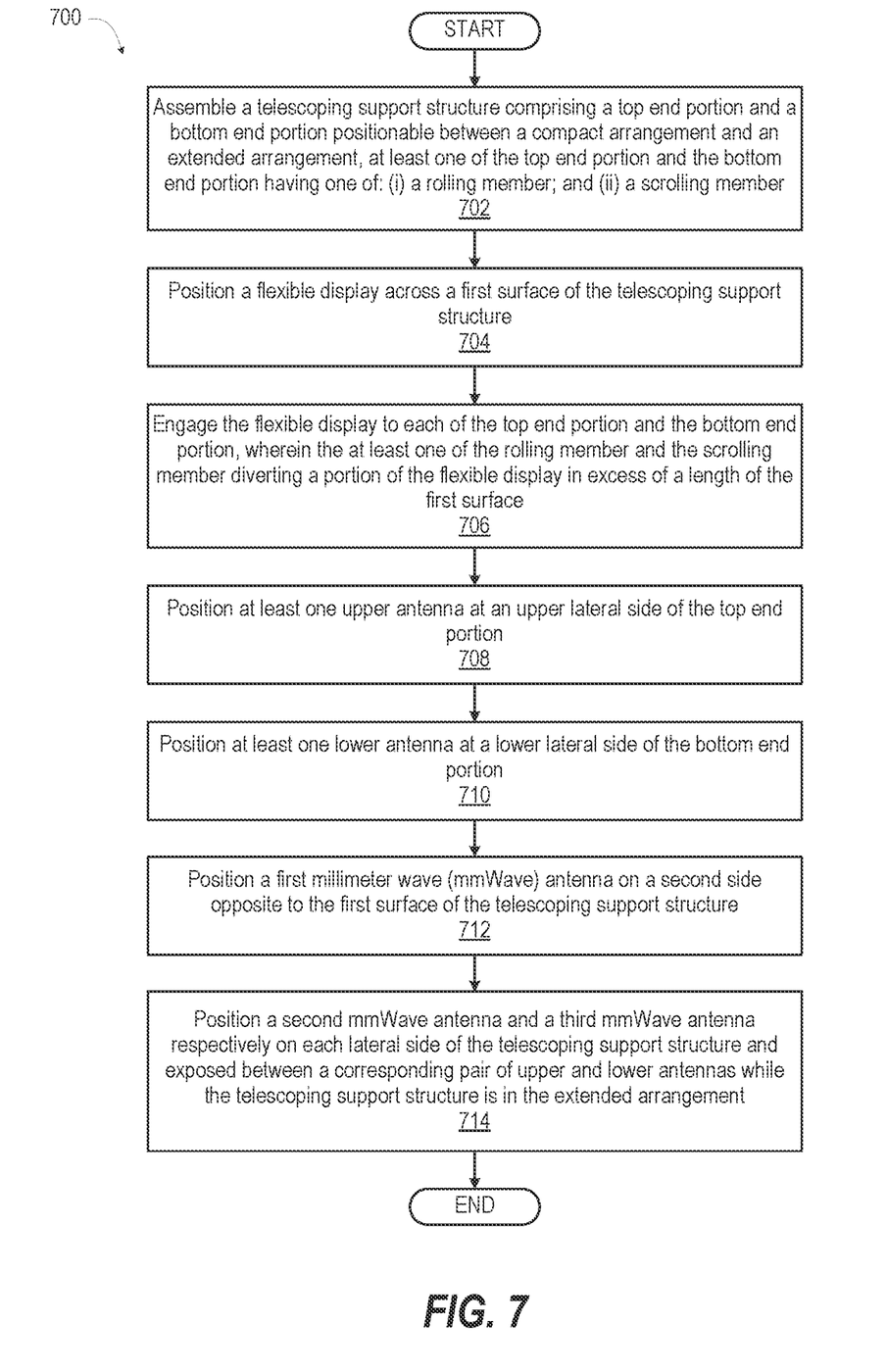
FIG. 7 is a flow diagram presenting a method performed by an automated manufacturing system to produce a communication device having antennas incorporated into rolling or scrolling display form factor, according to one or more embodiments.

FIG. 7 is a flow diagram presenting method 700 performed by an automated manufacturing system to produce a communication device having antennas incorporated into a rolling display form factor. The description of method 700 is provided with general reference to the specific components illustrated within the preceding FIGS. 1, 2A-2B, 3A-3D, 4A-4D, 5A-5D, and 6A-6D. Specific components referenced in method 700 (FIG. 7) may be identical or similar to components of the same name used in describing preceding FIGS. 1, 2A-2B, 3A-3D, 4A-4D, 5A-5D, and 6A-6D. In one or more embodiments, controller 101 configures an automated manufacturing system similar or identical to communication device 100 (FIG. 1) to provide the described functionality of method 700 (FIG. 7).

With reference to FIG. 7, method 700 includes assembling a telescoping support structure comprising a top end portion and a bottom end portion positionable between a compact arrangement and an extended arrangement, at least one of the top end portion and the bottom end portion having one of: (i) a rolling member; and (ii) a scrolling member (block 702). Method 700 includes positioning a flexible display across a first surface of the telescoping support structure (block 704). Method 700 includes engaging the flexible display to each of the top end portion and the bottom end portion, wherein the at least one of the rolling member and the scrolling member diverts a portion of the flexible display in excess of a length of the first surface (block 706). Method 700 includes positioning at least one upper antenna at an upper lateral side of the top end portion (block 708). Method 700 includes positioning at least one lower antenna at a lower lateral side of the bottom end portion (block 710). Method 700 includes positioning a first millimeter wave (mmWave) antenna on a second side opposite to the first surface of the telescoping support structure (block 712). In one or more embodiments, method 700 includes positioning a second mmWave antenna and a third mmWave antenna respectively on each lateral side of the telescoping support structure and exposed between a corresponding pair of upper and lower antennas while the telescoping support structure is in the extended arrangement (block 714). Then method 700 ends.

In one or more embodiments, the bottom end portion includes the one of the rolling member and the scrolling member. The at least one upper antenna includes two upper antennas positioned respectively at each upper lateral side of the top end portion and configured to support medium band (MB), high band (HB), and ultra-high band (UHB) radio frequency (RF) communication transmissions. The at least one lower antenna includes two lower antennas positioned respectively at each lower lateral side of the bottom end portion and configured to support low band (LB), MB, HB, and UHB RF communication transmissions. Method 700 includes positioning a top antenna across a top edge of the top end portion and configured to support reception of at least one of Global Positioning System (GPS) signals and wireless local area network (WLAN) signals.

In one or more embodiments, the top end portion includes the one of the rolling member and the scrolling member. The bottom end portion has one of: (i) a second rolling member; and (ii) a second scrolling member to divert a second portion of the flexible display in excess of a length of the first surface. In one or more particular embodiments, the at least one upper antenna includes two upper antennas positioned respectively at each upper lateral side of the top end portion and configured to support medium band (MB), high band (HB), and ultra-high band (UHB) radio frequency (RF) communication transmissions. The at least one lower antenna includes two lower antennas positioned respectively at each lower lateral side of the bottom end portion and configured to support low band (LB), MB, HB, and UHB RF communication transmissions. Method 700 includes positioning two wireless local area network (WLAN) antennas respectively at each lateral side of the telescoping structure between a corresponding pair of upper and lower antennas. Method 700 includes positioning a first millimeter wave (mmWave) antenna on a second side, opposite to the first surface of the telescoping support structure. In one or more specific embodiments, method 700 includes positioning a second mmWave antenna and a third mmWave antenna respectively on each lateral side of the telescoping support structure in an area exposed while the telescoping support structure is in the extended arrangement and not occupied by one of an upper antenna, a lower antenna, or a WLAN antenna.

In one or more embodiments, the top end portion includes the one of the rolling member and the scrolling member. The at least one lower antenna is positioned at the lower lateral side and an adjacent portion of a lower edge of the bottom end portion. In one or more particular embodiments, the at least one upper antenna comprises two upper antennas positioned respectively at each upper lateral side of the top end portion and configured to support medium band (MB), high band (HB), and ultra-high band (UHB) radio frequency (RF) communication transmissions. The at least one lower antenna comprises two lower antennas positioned respectively at each lower lateral side of the bottom end portion and configured to support low band (LB), MB, HB, and UHB RF communication transmissions. Method 700 includes positioning two wireless local area network (WLAN) antennas respectively at each lateral side of the telescoping structure between a corresponding pair of upper and lower antennas. Method 700 includes positioning a first millimeter wave (mmWave) antenna on a second side opposite to the first surface of the telescoping support structure. In one or more specific embodiments, method 700 includes positioning a second mmWave antenna and third mmWave antenna respectively on each lateral side of the telescoping support structure in an area exposed while in the extended arrangement and not occupied by one of an upper antenna, lower antenna or WLAN antenna.

In one or more embodiments, the at least one upper antenna is configured to support radio frequency (RF) communication transmissions in: (i) medium band (MB) of 1.7 to 2.2 GHz; (ii) high band (HB) of 2.3 to 2.7 GHz; and (iii) ultra-high band (UHB) of 3.3 to 5 GHz. The at least one lower antenna is configured to support RF communication transmissions in: (i) low band (LB) less than and/or equal to 1 GHz; (ii) MB; (iii) HB; and (iv) UHB.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a telescoping support structure comprising a top end portion and a bottom end portion positionable between a compact arrangement and an extended arrangement, at least one of the top end portion and the bottom end portion having one of: (i) a rolling member; and (ii) a scrolling member;
   a flexible display positioned across a first surface of the telescoping support structure and engaged to each of the top end portion and the bottom end portion, wherein the one of the rolling member and the scrolling member diverting a portion of the flexible display in excess of a length of the first surface;
   at least one upper antenna positioned at an upper lateral side of the top end portion;
   at least one lower antenna positioned at a lower lateral side of the bottom end portion; and
   at least one of a second mmWave antenna and a third mmWave antenna positioned respectively on a lateral side of the telescoping support structure and exposed between a corresponding pair of upper and lower antennas while the telescoping support structure is in the extended arrangement.

2. The communication device of claim 1, wherein:
   the bottom end portion comprises the one of the rolling member and the scrolling member;
   the at least one upper antenna comprises two upper antennas positioned respectively at each upper lateral side of the top end portion and configured to support medium band (MB), high band (HB), and ultra-high band (UHB) radio frequency (RF) communication transmissions;
   the at least one lower antenna comprises two lower antennas positioned respectively at each lower lateral side of the bottom end portion and configured to support low band (LB), MB, HB, and UHB RF communication transmissions; and
   the communication device further comprising:
      a top antenna positioned across a top edge of the top end portion and configured to support at least one of reception of Global Positioning System (GPS) signals and wireless local area network (WLAN) signals; and
      a first millimeter wave (mmWave) antenna positioned on a second side opposite to the first surface of the telescoping support structure.

3. The communication device of claim 1, wherein:
   the top end portion comprises the one of the rolling member and the scrolling member; and
   the bottom end portion has one of: (i) a second rolling member; and (ii) a second scrolling member to divert a second portion of the flexible display in excess of a length of the first surface.

4. The communication device of claim 1, further comprising:
   the at least one upper antenna comprises two upper antennas positioned respectively at each upper lateral side of the top end portion and configured to support medium band (MB), high band (HB), and ultra-high band (UHB) radio frequency (RF) communication transmissions;
   the at least one lower antenna comprises two lower antennas positioned respectively at each lower lateral side of the bottom end portion and configured to support low band (LB), MB, HB, and UHB RF communication transmissions; and
   the communication device further comprising:
      two wireless local area network (WLAN) antennas positioned respectively at each lateral side of the telescoping structure between a corresponding pair of upper and lower antennas; and
      a first millimeter wave (mmWave) antenna positioned on a second side opposite to the first surface of the telescoping support structure.

5. The communication device of claim 4, further comprising a second mmWave antenna and a third mmWave antenna positioned respectively on each lateral side of the telescoping support structure in an area exposed while the telescoping support structure is in the extended arrangement and not occupied by one of an upper antenna, a lower antenna, or a WLAN antenna.

6. The communication device of claim 1, wherein:
   the top end portion comprises the one of the rolling member and the scrolling member; and
   the at least one lower antenna positioned at the lower lateral side and an adjacent portion of a lower edge of the bottom end portion.

7. A communication device comprising:
   a telescoping support structure comprising a top end portion and a bottom end portion positionable between a compact arrangement and an extended arrangement, at least one of the top end portion and the bottom end portion having one of: (i) a rolling member; and (ii) a scrolling member;
   a flexible display positioned across a first surface of the telescoping support structure and engaged to each of the top end portion and the bottom end portion, wherein the one of the rolling member and the scrolling member diverting a portion of the flexible display in excess of a length of the first surface;
   at least one upper antenna positioned at an upper lateral side of the top end portion, the at least one upper antenna comprises two upper antennas positioned respectively at each upper lateral side of the top end portion and configured to support medium band (MB), high band (HB), and ultra-high band (UHB) radio frequency (RF) communication transmissions;
   at least one lower antenna positioned at a lower lateral side of the bottom end portion, the at least one lower antenna comprises two lower antennas positioned respectively at each lower lateral side of the bottom end portion and configured to support low band (LB), MB, HB, and UHB RF communication transmissions;

two wireless local area network (WLAN) antennas positioned respectively at each lateral side of the telescoping structure between a corresponding pair of upper and lower antennas; and a first millimeter wave (mmWave) antenna positioned on a second side opposite to the first surface of the telescoping support structure.

8. The communication device of claim 7, further comprising a second mmWave antenna and third mmWave antenna positioned respectively on each lateral side of the telescoping support structure in an area exposed while in the extended arrangement and not occupied by one of an upper antenna, lower antenna or WLAN antenna.

9. The communication device of claim 1, wherein:

the at least one upper antenna is configured to support radio frequency (RF) communication transmissions in: (i) medium band (MB) of 1.7 to 2.2 GHz; (ii) high band (HB) of 2.3 to 2.7 GHZ; and (iii) ultra-high band (UHB) of 3.3 to 5 GHz; and the at least one lower antenna is configured to support RF communication transmissions in: (i) low band (LB) less than and equal to 1 GHz; (ii) MB; (iii) HB; and (iv) UHB.

10. A method comprising:

assembling a telescoping support structure comprising a top end portion and a bottom end portion positionable between a compact arrangement and an extended arrangement, at least one of the top end portion and the bottom end portion having one of: (i) a rolling member; and (ii) a scrolling member;

positioning a flexible display across a first surface of the telescoping support structure;

engaging the flexible display to each of the top end portion and the bottom end portion, wherein the one of the rolling member and the scrolling member diverting a portion of the flexible display in excess of a length of the first surface;

positioning at least one upper antenna at an upper lateral side of the top end portion;

positioning at least one lower antenna at a lower lateral side of the bottom end portion; and positioning at least one of a second mmWave antenna and a third mmWave antenna respectively on a lateral side of the telescoping support structure and exposed between a corresponding pair of upper and lower antennas while the telescoping support structure is in the extended arrangement.

11. The method of claim 10, wherein:

the bottom end portion comprises the one of the rolling member and the scrolling member;

the at least one upper antenna comprises two upper antennas positioned respectively at each upper lateral side of the top end portion and configured to support medium band (MB), high band (HB), and ultra-high band (UHB) radio frequency (RF) communication transmissions;

the at least one lower antenna comprises two lower antennas positioned respectively at each lower lateral side of the bottom end portion and configured to support low band (LB), MB, HB, and UHB RF communication transmissions; and the method further comprises:

positioning a top antenna across a top edge of the top end portion and configured to support at least one of reception of Global Positioning System (GPS) signals and wireless local area network (WLAN) signals; and positioning a first millimeter wave (mmWave) antenna on a second side opposite to the first surface of the telescoping support structure.

12. The method of claim 10, wherein:

the top end portion comprises the one of the rolling member and the scrolling member; and the bottom end portion has one of: (i) a second rolling member; and (ii) a second scrolling member to divert a second portion of the flexible display in excess of a length of the first surface.

13. The method of claim 10, wherein:

the at least one upper antenna comprises two upper antennas positioned respectively at each upper lateral side of the top end portion and configured to support medium band (MB), high band (HB), and ultra-high band (UHB) radio frequency (RF) communication transmissions;

the at least one lower antenna comprises two lower antennas positioned respectively at each lower lateral side of the bottom end portion and configured to support low band (LB), MB, HB, and UHB RF communication transmissions; and the method further comprises:

positioning two wireless local area network (WLAN) antennas respectively at each lateral side of the telescoping structure between a corresponding pair of upper and lower antennas; and positioning a first millimeter wave (mmWave) antenna on a second side opposite to the first surface of the telescoping support structure.

14. The method of claim 13, further comprising positioning a second mmWave antenna and a third mmWave antenna respectively on each lateral side of the telescoping support structure in an area exposed while the telescoping support structure is in the extended arrangement and not occupied by one of an upper antenna, a lower antenna, or a WLAN antenna.

15. The method of claim 10, wherein:

the top end portion comprises the one of the rolling member and the scrolling member; and the at least one lower antenna positioned at the lower lateral side and an adjacent portion of a lower edge of the bottom end portion.

16. The method of claim 10, wherein:

the at least one upper antenna comprises two upper antennas positioned respectively at each upper lateral side of the top end portion and configured to support medium band (MB), high band (HB), and ultra-high band (UHB) radio frequency (RF) communication transmissions;

the at least one lower antenna comprises two lower antennas positioned respectively at each lower lateral side of the bottom end portion and configured to support low band (LB), MB, HB, and UHB RF communication transmissions; and the method further comprises:

positioning two wireless local area network (WLAN) antennas positioned respectively at each lateral side of the telescoping structure between a corresponding pair of upper and lower antennas; and positioning a first millimeter wave (mmWave) antenna on a second side opposite to the first surface of the telescoping support structure.

17. The method of claim 16, further comprising positioning a second mmWave antenna and third mmWave antenna respectively on each lateral side of the telescoping support structure in an area exposed while in the extended arrangement and not occupied by one of an upper antenna, lower antenna or WLAN antenna.

18. The method of claim 10, wherein:
the at least one upper antenna is configured to support radio frequency (RF) communication transmissions I n: (i) medium band (MB) of 1.7 to 2.2 GHz; (ii) high band (HB) of 2.3 to 2.7 GHZ; and (iii) ultra-high band (UHB) of 3.3 to 5 GHz; and
the at least one lower antenna is configured to support RF communication transmissions in: (i) low band (LB) less than and equal to 1 GHz; (ii) MB; (iii) HB; and (iv) UHB.

\* \* \* \* \*